United States Patent [19]
Roth et al.

[11] Patent Number: 6,012,348
[45] Date of Patent: Jan. 11, 2000

[54] ANGLE DRIVE

[75] Inventors: Andreas Roth, Kirschau; Johannes Jacob, Obergurig; Karl Coenen, Siegburg, all of Germany

[73] Assignee: GKN Walterscheid GmbH, Lohmar, Germany

[21] Appl. No.: 08/949,276

[22] Filed: Oct. 13, 1997

[30] Foreign Application Priority Data

Oct. 24, 1996 [DE] Germany .......................... 196 43 559

[51] Int. Cl.[7] .................................................. F16H 1/14
[52] U.S. Cl. ............................. 74/417; 74/423; 74/606 R
[58] Field of Search ................................. 74/417, 606 R, 74/89.13, 423

[56] References Cited

U.S. PATENT DOCUMENTS

| 548,083 | 10/1895 | North | 74/417 |
|---|---|---|---|
| 666,548 | 1/1901 | Parker | 74/417 |
| 3,442,444 | 5/1969 | Kievit | 74/417 |

FOREIGN PATENT DOCUMENTS

| 829525 | 6/1938 | France | 74/417 |
|---|---|---|---|
| 1552067 | 11/1968 | France | 74/417 |
| 597762 | 5/1934 | Germany | 74/414 |
| 1094072 | 12/1960 | Germany . | |
| 1775666 | 8/1971 | Germany . | |
| 4114342 C2 | 4/1994 | Germany . | |
| 362367 | 11/1931 | United Kingdom | 74/417 |
| 2223068 | 3/1990 | United Kingdom . | |

*Primary Examiner*—Tamara L. Graysay
*Assistant Examiner*—William C Joyce
*Attorney, Agent, or Firm*—Harness, Dickey & Pierce, P.L.C.

[57] ABSTRACT

An angle drive, especially for agricultural implements, has a housing with two housing portions (1, 2). The two housing portions (1, 2) abut one another at a right angle. The angle drive is provided with a first bevel gear (11) arranged in the first housing portion. A second bevel gear (27) is arranged in the second housing portion. The two bevel gears (11, 27) are each supported by rolling contact bearings (16, 17, 33). The housing interior is sealed by seals (20, 20') between the first bevel gear (11) and the first housing portion (1) and between the second bevel gear (27) and the second housing portion (2). The two housing portions (1, 2) which concentrate on merely covering the outlines of the two bevel gears (11, 27) and provide an aperture (25) in the region of abutment between the two housing portions (1, 2), in which the two sets of teeth (14, 18) engage one another, produce a compact unit with a small enclosed volume. Thus, a little space is required and the required amount of lubricating oil is also small.

9 Claims, 2 Drawing Sheets

ANGLE DRIVE

BACKGROUND OF THE INVENTION

The invention relates to an angle drive, especially for driving drives of agricultural implements. The angle drive has a housing and two bevel gears engaging one another and enclosed by the housing. A sealing means is also included.

Such an angle drive is used for driving the circular plate of a hay tedder, e.g. multiple rotary tedder, which circular plate carries the spiked arms. The housing of the angle drive is formed by a portion of the carrying frame of the implement. The portions arranged side by side at a distance from one another. The portions are connected by carrying tubes. A shaft passes through the carrying tubes to drive a plurality of angle drives.

Furthermore, bevel gear angle drives are known where the housing supporting the bevel gears are provided substantially in the form of cuboid-shaped boxes. The disadvantage of such embodiments is that the housing includes a relatively large volume which is filled with lubricating oil. If the volume is partially filled with lubricant oil, situations may arise where the bevel gears are not sufficiently lubricated when the implements are on slopes. A further disadvantage exists in the case of leakages, a relatively large amount of oil may escape.

SUMMARY OF THE INVENTION

It is therefore an object of the invention to provide an angle drive which constitutes a compact and sealed unit.

In accordance with the invention, the housing includes a first housing portion. With reference to the first rotational axis of the first bevel gear, the first housing portion includes a radially inner annular wall or journal and a radially spaced first annular outer wall. A first end wall connects the inner and outer walls. Thus, an annular chamber is formed between the walls. A second housing portion extends at an angle relative to the first housing portion. The second housing portion includes an outer wall which extends annularly around a second rotational axis. The outer wall is integrally connected to the outer annulus wall of the first housing portion. An aperture leading to the annular chamber is formed in the second outer wall. The second housing portion also includes a second end wall. The second end wall is formed to be integral with the first end wall of the first housing portion. The annular chamber of the first housing portion accommodates the first bevel gear. The first bevel gear teeth point toward the first end wall. The second bevel gear is arranged in the second housing portion. The teeth of the second bevel gear points towards the second end wall. The teeth of the first and second bevel gears engage in the region of the aperture between the two housing portions.

By inserting the parts into one another, a unit is provided which requires a small space. The dead space in the housing is correspondingly small. Accordingly, the amount of oil required for lubricating the drive is extremely small. In consequence, oil losses in the case of leakages are small.

Furthermore, it is possible to achieve a unit which enables a shaft to pass through the housing, so that for example a central shaft can be used for driving a plurality of angle drives arranged side by side. Thus, there is no need to take any measures on the drive housing itself. For example, there is no need for any seals with a sealing effect relative to the passing shaft. In a preferred embodiment, the two housing portions and the two rotational axes are arranged so as to extend at right angles relative to one another. Different angles are also possible.

An advantageous embodiment is achieved when the first bevel gear includes a bearing portion centered on the first rotational axis. The bearing portion includes a bearing bore and is supported by at least one rolling contact bearing. The roller bearing together with a seal removed from the first end wall, is attached in the annular gap between a bearing seat face of the inner wall and the bearing bore. The bearing portion also includes an outer sealing face. A seal is arranged between the outer sealing face and a bore of the outer wall of the first housing portion. With this assembly, the seals are accommodated so as to be protected.

A further advantageous embodiment is achieved by the annular outer wall of the second housing portion including a receiving bore for a rolling contact bearing. The receiving bore also receives a seat face of a seat portion formed onto the second bevel gear. The annular aperture between the seat portion and the bearing bore is outwardly sealed by a seal away from the second wall of the second housing portion.

To connect the second bevel gear to a shaft, the second bevel gear, together with its formed-on seat portion, includes a connecting throughbore which receives the shaft. Furthermore, a second end wall is provided with a bore which receives a projection of the second bevel gear. A seal and optionally a further bearing are arranged between the bore and the projection. In this way, it becomes possible to guide the complete shaft through the second housing portion. The shaft may include a splined profile or a multi-edge profile. A matching profile is broached into the bore of the second bevel gear.

In a preferred embodiment, two spaced rolling contact bearings are used to support the first bevel gear. A connecting means includes a component to be driven. The connecting means includes connecting bores at the end face of the bearing portion. The end face faces away f rom the tooth. In addition, a seat face may be provided to center the components to be connected. For example, a plate carrying the spike arms of a hay tedder can be bolted to the bearing portion.

The outer annulus wall of the first ho using portion ma y include form ed-on eyes or the like, which include fixing bores to enable bolt passage to secure the housing. Alternatively, it is possible to use the bore in the inner annulus wall of the first housing portion to secure the drive to a journal. Furthermore, the bore may also serve to support or fix a component of a machine, so that the drive holds a machine part.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the inventive drive is diagrammatically illustrated in the drawing wherein.

DETAILED DESCRIPTION OF THE DRAWINGS

Figure 1:
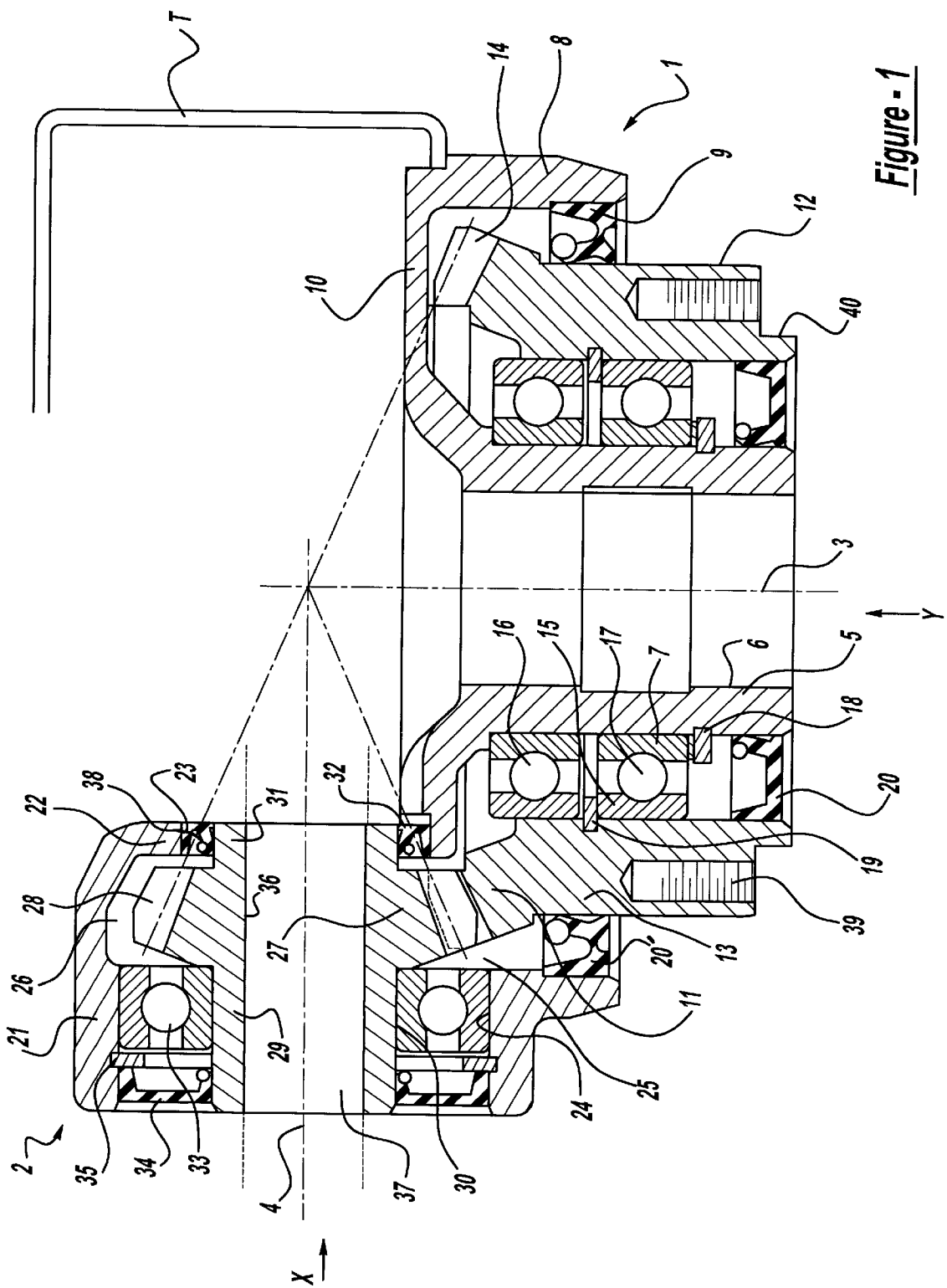
FIG. 1 is a cross-sectional view through a housing with the two housing portions in a plane which contains the rotational axes of the two bevel gears.
Figure 2:
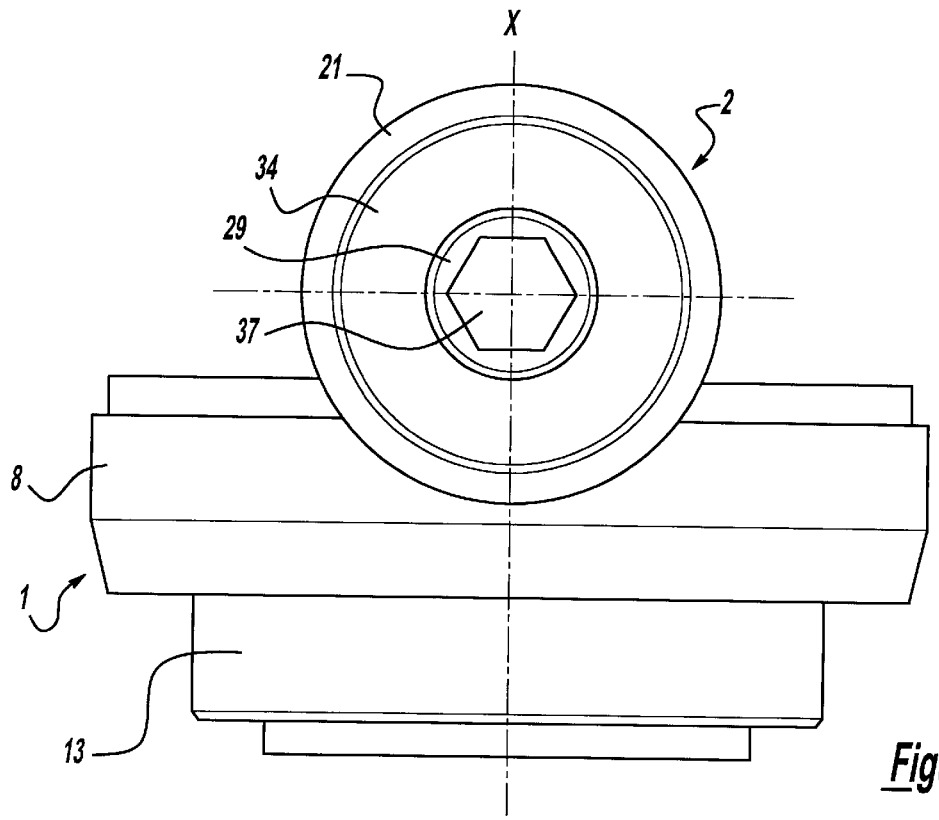
FIG. 2 is an elevation view of the drive of FIG. 1 in direction X.
Figure 3:
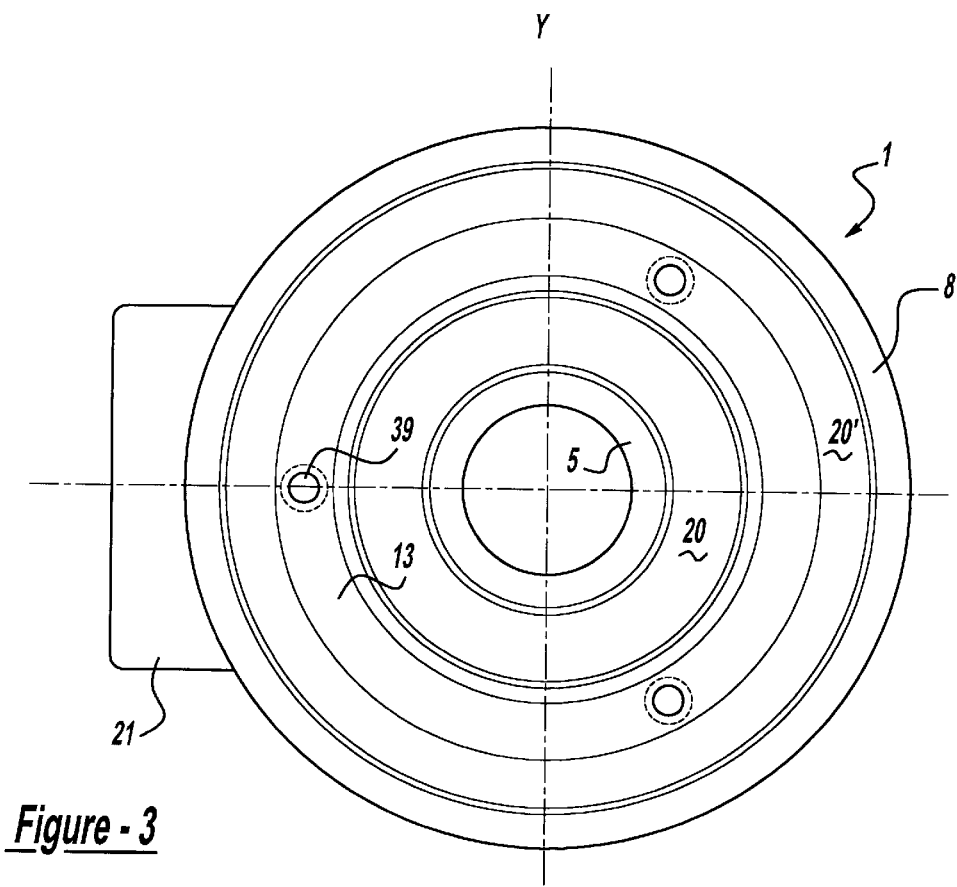
FIG. 3 is an elevation view of the drive of FIG. 1 in direction Y.

In FIG. 1, the inventive drive according to FIGS. 1 to 3 is associated with a carrying frame T in the form of a box frame. The drive includes a housing which is composed of a first housing portion 1 and a second housing portion 2. The first housing portion 1 receives a first bevel gear which is arranged to rotate around a first rotational axis 3. The second housing portion 2 is associated with a second bevel gear which is arranged to rotate around the second rotational axis 4.

The two housing portions extend substantially at a right angle relative to one another. Thus, the two rotational axes 3, 4 are arranged in one plane and are positioned perpendicularly to one another.

The first housing portion includes a first inner annulus wall 5. The first annulus wall 5 has a bore 6 centered on the first rotational axis 3. A cylindrical bearing seat face 7 is on the exterior face of the first annulus wall 5. An outer annulus wall 8, which is shorter in the direction of the rotational axis 3, is arranged at a radial distance from the inner annulus wall 5. Both walls are connected to one another by a first end wall 10. Thus, an annular space is between the two annulus walls 5, 8. The space is closed at one end and serves to receive the first bevel gear 11.

Away from its teeth 14, the first bevel gear 11 is provided with a bearing portion 13. The bearing portion 13 is ring-shaped and is provided with a bearing bore 15. On its outer face, the bearing portion 13 includes a sealing face 12. The first bevel gear 11 is supported by two rolling contact bearings 16, 17. The bearings 16, 17 seat on the bearing seat face 7 of the inner annulus wall 5 of the outer housing portion 1. For this purpose, the outer bearing rings of the two rolling contact bearings 16, 17 are received in the bearing bore 15. The bearings' two inner rings are accommodated on the bearing seat face 7. Two securing rings 18, 19 fix the rolling contact bearing 17 in the direction of the rotational axis 3. Securing ring 18 engages a groove in the bearing seat face 7 of the inner annulus wall to secure the inner bearing ring. The second securing ring 19 is supported in a groove in the bearing bore 15 of the bearing portion 13 of the first bevel gear 11. The teeth 14 point towards the first end wall 10 of the first housing portion 1. The gap between the bore 9 in the outer annulus wall 8 and the cylindrical sealing face 12 of the first bevel gear 11 is sealed by the seal 20'. The annular gap between the bearing bore 15 and the bearing seat face 7 is sealed by a seal 20. Thus, due to the seals 20, 20', the housing portion 1 is fully sealed towards the outside. Furthermore, in its end face associated with the bearing portion 13 and facing away from the teeth 14, the first bevel gear 1 1 includes circumferentially distributed threaded bore 39 and a centering seat 40 which connect to a drive component.

The second housing portion 2 includes an annular outer wall 21 which changes into the outer annulus wall 8. The annular outer wall 21 ends in an end wall 22 which changes into the first end wall 1 0 of the first housing portion 1. The annular outer wall 21 includes a receiving bore 24 which is centered on the rotational axis 4. The end wall 22 is also centered on the rotational axis 4.

The second bevel gear 27 has teeth 28 towards the second end wall 22. Furthermore, the gear 27 has a projection 31 which extends into the bore 23 of the end wall 22. A seat portion 29 of the gear 27 projects towards the opposite end of the housing portion 6. The seat portion 29 on its outside has a cylindrical seat face 30.

The two sets of teeth 14, 28 of the two bevel gears 11, 27 extend into an aperture 25. The aperture 25 is arranged in the abutment region of the two housing portions 1, 2. The two sets of teeth 14, 28 engage one another in this region.

The second bevel gear 27 is supported in the inner chamber 26 of the second housing portion 2 by a rolling contact bearing 33. The inner bearing ring of the bearing 33 is positioned on the seat face 30 of the seat portion 29. The outer bearing ring of the bearing 37 is secured in the receiving bore 24 by a securing ring 35. The securing ring 35 prevents the bearing 33 from axially displacement out of the second housing portion 2.

A sealing ring 38 is inserted between the outer face 32 of the projection 31 and the wall of the bore 23. A further sealing ring 34 is inserted into the annular gap between the receiving bore 24 and the seat face 30 of the second bevel gear 27. The second bevel gear includes a connecting bore 36. The connecting bore 36 has a cross-section deviating from a circular cross-section or a splined profile. The bore 36 receives a shaft 37 whose cross-section is correspondingly shaped and which drives the bevel gear 27.

While the above detailed description describes the preferred embodiment of the present invention, the invention is susceptible to modification, variation and alteration without deviating from the scope and fair meaning of the subjoined claims.

We claim:

1. An angle drive for agricultural implements, comprising:

a housing, a first bevel gear and a second bevel gear engaging one another and enclosed by the housing, and sealing means sealing said gears within said housing;

said housing including a first housing portion which, with reference to a first rotational axis of said first bevel gear, includes a radial first inner annular wall and a first annular outer wall, radially spaced from said first inner annular wall, a first end wall unitarily formed with said first inner annular wall and said first annular outer wall, an annular chamber formed between said first end, said first annular inner wall and said first annular outer wall;

a second housing portion extending at an angle relative to the first housing portion, said second housing portion including a second outer wall extending annularly around a second rotational axis, said second rotational axis arranged at an angle relative to the first rotational axis, said second outer wall being unitarily formed with said first annular outer wall of the first housing portion, an aperture defined by said second outer wall leading to the annular chamber, said second housing portion including a second end wall unitarily formed with the first end wall of the first housing portion, said annular chamber of the first housing portion accommodating the first bevel gear, said first bevel gear teeth pointing towards the first end wall and said second bevel gear being arranged in the second housing portion, with teeth of said second bevel gear pointing towards the second end wall and said teeth of the first and second bevel gears engaging in the region of the aperture between the two housing portions and said sealing means comprising a first seal sealing between said first bevel gear and said first inner annular wall and a second seal sealing between said first bevel gear and said first annular outer wall.

2. An angle drive according to claim 1, wherein said two housing portions and two rotational axes are arranged at a right angle relative to one another.

3. An angle drive according to claim 1, wherein the first bevel gear includes a bearing portion centered on the first rotational axis and a bearing bore, said first bevel gear supported by at least one rolling contact bearing and said first seal and second seal.

4. An angle drive according to claim 1, wherein the second outer wall of the second housing portion is provided with a receiving bore for a rolling contact bearing which receives a seat face of a seat portion formed onto the second bevel gear, and said receiving bore and said seat face defining an annular aperture between them which annular aperture is sealed by a seal arranged in said annular aperture between the seat portion and the bearing bore and which seat is positioned away from the second end wall of the second housing portion.

5. An angle drive according to claim 3, wherein the second bevel gear includes a seat portion and a connecting throughbore for connecting a shaft.

6. An angle drive according to claim 3, wherein the second end wall includes a bore into which there extends a projection of the second bevel gear, and the second bevel gear includes a seal positioned between said second end wall bore and the projection for sealing the second bevel gear within the housing.

7. An angle drive according to claim 1, wherein the first bevel gear is supported by two spaced rolling contact bearings.

8. An angle drive according to claim 1, wherein a bearing portion of the first bevel gear includes an end face facing away from the teeth, of the first bevel gear; said end face includes connecting means for connecting a drive component.

9. An angle drive according to claim 1, wherein a bore of the inner annular wall serves as a receiving bore for a component to be supported.

* * * * *